G. A. WENDT.
CREAM SEPARATOR.
APPLICATION FILED NOV. 15, 1920.
1,432,816. Patented Oct. 24, 1922.
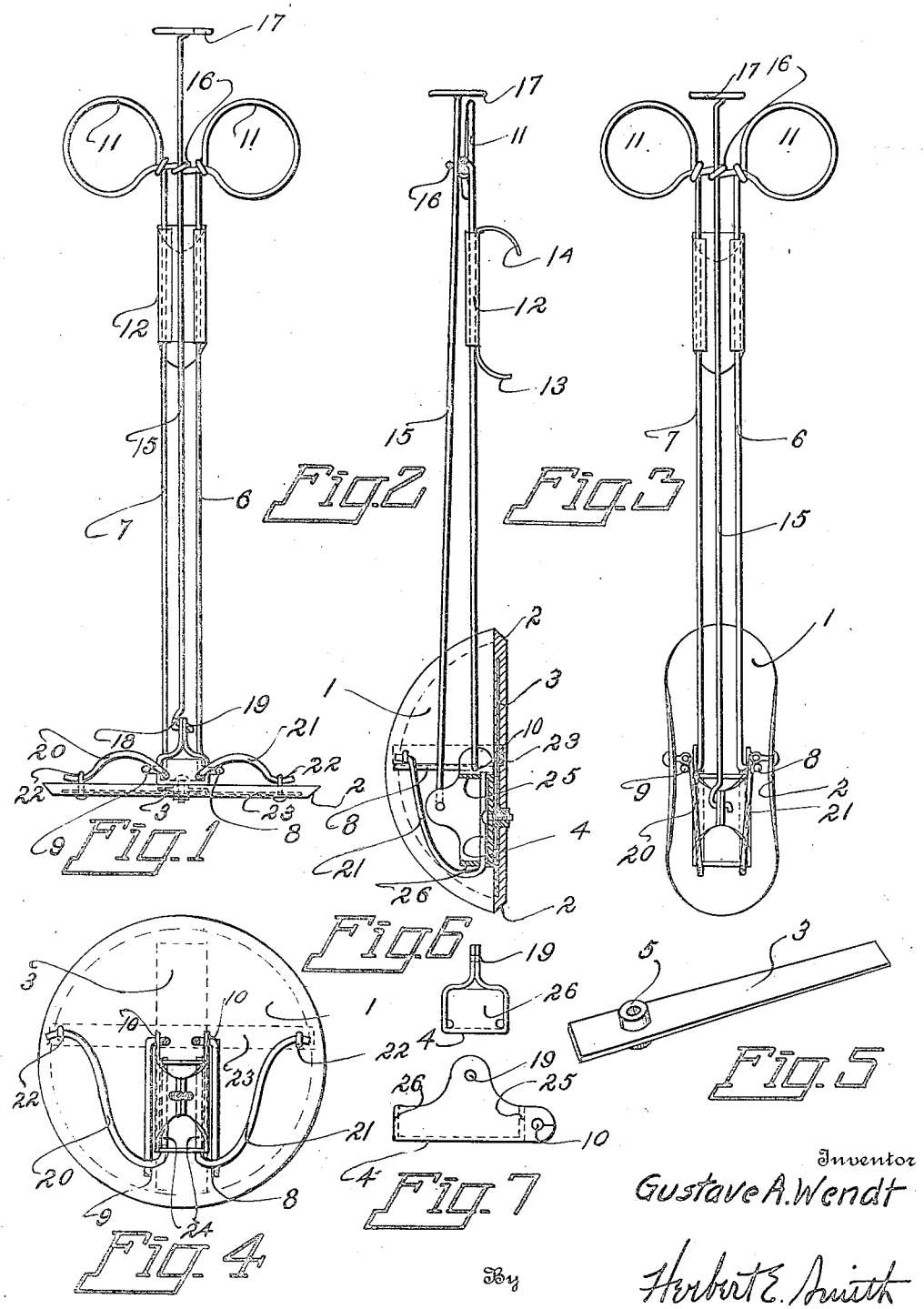
Inventor
Gustave A. Wendt
By Herbert E. Smith
Attorney Patented Oct. 24, 1922.

1,432,816

UNITED STATES PATENT OFFICE.

GUSTAVE A. WENDT, OF SPOKANE, WASHINGTON, ASSIGNOR OF ONE-HALF TO CARL A. LARSON, OF SPOKANE, WASHINGTON.

CREAM SEPARATOR.

Application filed November 15, 1920. Serial No. 424,063.

*To all whom it may concern:*

Be it known that I, GUSTAVE A. WENDT, a citizen of the United States, residing at Spokane, in Spokane County and State of Washington, have invented certain new and useful Improvements in Cream Separators, of which the following is a specification.

My present invention relates to improvements in cream separators designed especially as a household utensil or domestic implement, which is hand operated for insertion into a milk bottle or other receptacle, and adapted to engage under the level of the cream formed on the top of the contained milk, for withdrawing the cream without disturbance of the milk, and without intermingling of the milk with the cream.

The primary object of the invention is the provision of a device of this character which may be adapted for facile introduction into the milk bottle or receptacle without unduly disturbing the cream, and after insertion through the cream, may be positioned under the cream to separate the cream from the milk and subsequently be withdrawn, lifting the cream from the bottle.

With the above purpose in view the invention consists in the construction of a device of this type whereby upon the manipulation of an actuating device, the flexible disk which forms the cream separating and lifting element, is capable of a bodily movement into alinement with its support and also of a folding movement upon itself to conform to the neck of the bottle or opening for insertion into and through the cream. After insertion into the bottle, the disk may be restored to normal position for withdrawal and lifting of the separated cream. The invention further consists in certain novel combinations and arrangements of parts as will be hereinafter more fully described and claimed.

In the accompanying drawings I have illustrated one complete example of the physical embodiment of my invention wherein the parts are combined and arranged according to the best mode I have thus far devised for the practical application of the principles of my invention.

Figure 1 is a side view of a device embodying the novel features of the invention, the parts being shown in normal operative position for withdrawing the cream from the bottle.

Figure 2 is a view showing the flexible, cream-lifting disk in section, and in position for insertion into the bottle neck.

Figure 3 is a side view of the device, as seen from the left in Figure 2.

Figure 4 is a top plan view of the cream lifting disk, the supporting bars and push or actuating bar being shown in section for convenience of illustration.

Figure 5 is a perspective view of a metal base or retaining plate of the flexible disk.

Figure 6 is an edge view of the connecting plate, detached, for the supporting and actuating members and disk.

Figure 7 is a side view of this connecting member.

In the preferred form of the invention as illustrated in the drawings I utilize a flat flexible circular disk 1 of suitable size and thickness, and preferably of rubber or other suitable material, as the cream lifting element, and fashion the disk with a bevel edge 2. The disk is made in standard sizes complementary to milk bottles and the beveled edge insures the entrance of the folded disk into and through the cream with least resistance and consequent minimum disturbance of the cream, and this comparatively thin formation of the disk edge also assures a wiping action of the disk on the interior walls of the milk bottle as the cream is lifted by the disk, to prevent leakage of the cream as it is being withdrawn.

To insure durability of the device I utilize a base plate 3 secured to the flexible disk, which is preferably of non-corrodible metal, to which the connecting plate 4 is secured at 5. The connecting plate 4 is rigidly and firmly attached to the disk, and the wings of the disk are adapted to be folded around parallel with the longitudinal plane of the connecting plate, while the plate and disk are adapted to move bodily through an angle of approximately 90 degrees, as indicated in the drawings.

The disk is supported on a pair of parallel bars 6 and 7, each of which has an angular arm as 8 and 9 passed through an opening 10 in the connecting plate, the arms being slightly offset from alinement with the bars, and when in normal position lying parallel with one another and parallel with the plane face of the disk, at an angle of about 90 degrees from the bars. At their upper ends the supporting bars have integral coils 11 forming handles or fingerholds, and a slidable gage plate 12 may be utilized to adjust the device in order to insure the insertion of the disk to the proper depth in the milk bottle. The gage plate has a lower abutment 13 to contact with the top edge of the milk bottle opening, and an upper lug 14 as a hand hold when sliding the gage plate to adjusted position on the bars.

The disk, through its connecting plate, is thus pivoted at 10 10 on the supporting bars, and is capable of bodily movement from the perpendicular position of Figure 1 through an angle of 90 degrees to a position parallel with the plane of the supporting bars, the arms 8 and 9 remaining at all times in rigid relationship with the bars.

For actuating the disk I employ a push rod 15 located parallel with the supporting bars and between them, and guided in the integral loop 16 between the two coils 11 of the handle, and at its upper free end the push rod has an angular coil 17 to be utilized as a handle. At its lower end the push rod is formed with a pivot hook 18 engaged in the opening 19 of the connecting plate 4, and it will be apparent that the connecting plate performs the function of an operating lever with its fulcrum at 10 and the power applied at 19 to swing the disk and connecting plate into or out of alinement with the supporting bars under manipulation of the push rod.

The manipulation of the rod 15 to swing the disk also results in folding or unfolding the flexible disk as indicated in the drawings, the two arms 8 and 9 being utilized as cam arms to co-act with a pair of cam levers 20 and 21. These cam levers are formed with cam arms fashioned on compound curves as best seen in Figure 4, with their outer ends pivoted in eyes 22 22 secured near the opposed edges of the disk to a resilient retaining strip or plate 23 in the disk extending transversely of the retaining or base plate 2 of the disk. The cam levers each has a bearing arm 24 journaled in alined openings in the front and rear end walls 25 and 26 respectively of the connecting plate 4, and these bearing arms which lie parallel with the connecting plate are spaced at the sides of the pivotal connection 18—19 of the actuating rod and connecting plate as shown.

From the above description taken in connection with the drawings it will be apparent that, with the parts in position of Figure 1, when the rod 15 is pushed down, the disk is caused to bodily swing on its pivot 10, causing that portion of the disk beyond the terminals of the arms 8 and 9 to move away from the ends of these arms, which ends are located under the cam arms 20 and 21. The bearing ends of the cam arms being anchored to the connecting plate and disk, the resulting action of the swinging movement of the disk causes the arms 20 21 to ride over the fixed cam arms and the lever arms 20 21 are thus caused to swing toward each other on their bearing arms 24, drawing the free edges of the disk to folded position as in Figures 2 and 3. The gage plate 12 having previously been adjusted on the supporting bars, the disk is now inserted through the neck of the bottle until the stop lug contacts with the top edge of the bottle neck. The folded disk passes along the wall of the bottle neck until the gage lug encounters the neck of the bottle, then the rod 15 is pulled to position of Figure 1 swinging the disk to perpendicular position with relation to the supporting bars, and unfolding the wings of the flexible disk, with the flattened disk separating the cream from the milk. By means of the fingers which grasp the coils 11, the implement is bodily withdrawn through the neck bottle, lifting with it the cream supported thereon, and the cream is disposed of as desired.

What I claim is—

In a device as described the combination with a handle support, of a pivoted connecting plate and a flexible disk secured thereto, a push rod pivoted to said plate, cam levers pivoted on said plate and loosely connected to opposed free edges of said disk, and complementary cam arms fixed to said handle support, whereby the disk is bodily swung on its pivot for insertion into a bottle and its free edges folded outwardly for removal of cream from the bottle.

In testimony whereof I affix my signature.

GUSTAVE A. WENDT.